(12) United States Patent
Tuttle

(10) Patent No.: US 6,591,246 B1
(45) Date of Patent: Jul. 8, 2003

(54) AUTOMATED SKILLS PROGRAM

(75) Inventor: Doreen M. Tuttle, Erial, NJ (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 511 days.

(21) Appl. No.: 09/097,398

(22) Filed: Jun. 16, 1998

(51) Int. Cl.[7] .............................................. G06F 17/60
(52) U.S. Cl. ................... 705/11; 705/1; 705/9
(58) Field of Search .................. 705/11, 9, 1

(56) References Cited

U.S. PATENT DOCUMENTS

| | | | | |
|---|---|---|---|---|
| 5,111,391 A | * | 5/1992 | Fields et al. ................ | 364/401 |
| 5,164,897 A | * | 11/1992 | Clark et al. ................ | 364/401 |
| 5,726,914 A | * | 3/1998 | Janovski et al. ........... | 364/552 |
| 5,893,905 A | * | 4/1999 | Main et al. ................. | 705/11 |
| 5,909,669 A | * | 6/1999 | Havens ...................... | 705/11 |
| 5,926,794 A | * | 7/1999 | Fethe ......................... | 705/11 |

FOREIGN PATENT DOCUMENTS

EP 0 472 786 A1 * 8/1990

OTHER PUBLICATIONS

Stephen W. Plain, Tackle Your Data: Seven Databases to Boost Your Productivity, Home Office Computing, vol. 13, No. 1, p. 85(5), Jan. 1995.*
Marc, Kustoff, HR–1—Mainframe Micros' Comprehensive HRIS, Personnel Administrator, vol. 31, No. 12, pp. 32–40, Dec. 1984 (Abstract only).*

* cited by examiner

*Primary Examiner*—Rena Dye
*Assistant Examiner*—J Harle
(74) *Attorney, Agent, or Firm*—Jacob Shuster

(57) ABSTRACT

Personnel information on employees respectively identified by social security numbers is initially entered in sequence and stored with number coding in data tables that are repeatedly updated to maintain access to current data for look-up and extraction of reports on selected categories of such data from which comparative technical skills of the employees may be assessed.

2 Claims, 2 Drawing Sheets

AUTOMATED SKILLS PROGRAM

BACKGROUND OF THE INVENTION

The present invention is directed to a method of providing updated assessment data on available resources such as workforce technical skills for marketing purposes as well as to identify skill shortages to be rectified by employee training or recruitment, match employee skills to workload and centralize employee data statistics not readily available from personnel records.

Computer automated methods for management of resources are generally known in the art as disclosed for example in U.S. Pat. Nos. 4,937,743 and 5,164,897 to Rassman et al. and Clark et al., respectively. According to the Rassman et al. patent, the resources to be managed involve scheduling and monitoring activities such as medical procedures based on data regarding patients, surgery personnel and medical facilities. According to the Clark et al. patent, the resources to be managed involve personnel to be matched with job criteria for selection or recruitment of personnel.

SUMMARY OF THE INVENTION

In accordance with the present invention, a computer operated program establishes a data base table by collection of information from which reports are provided to managers or the like for assessments and analyses of technical skills of workforce employees. Such reports embody extraction of employee statistics from personnel records for identification of skill shortages and matching of employee skills with workloads.

The database established pursuant to the present invention utilizes a mission numbering system covering for example the entire life cycle of a ship, referred to as expanded ship work breakdown structure (ESWBS). Such numbering system acts as a single indenturing code for stages of the program interfacing with other numerical code identifications used in strategic and workload planning as well as being consistent with denoting technical skill levels. A detailed data table is established by the program utilizing data collected in a consistent format, to provide skill level assessment. Database extracted reports also provide for statistical analysis of the entire workforce of employees or selected portions thereof formed for example as departments, directorates or groups. Further, each employee will be provided by the program with an administrative report through which to track information in connection with career development planning and to store data for preparation of resumes and supervisory consultation on performance and training.

BRIEF DESCRIPTION OF DRAWING

A more complete appreciation of the invention and many of its attendant advantages will be readily appreciated as the same becomes better understood by reference to the following detailed description when considered in connection with the accompanying drawing wherein.

DETAILED DESCRIPTION OF PREFERRED EMBODIMENT

Figure 1:
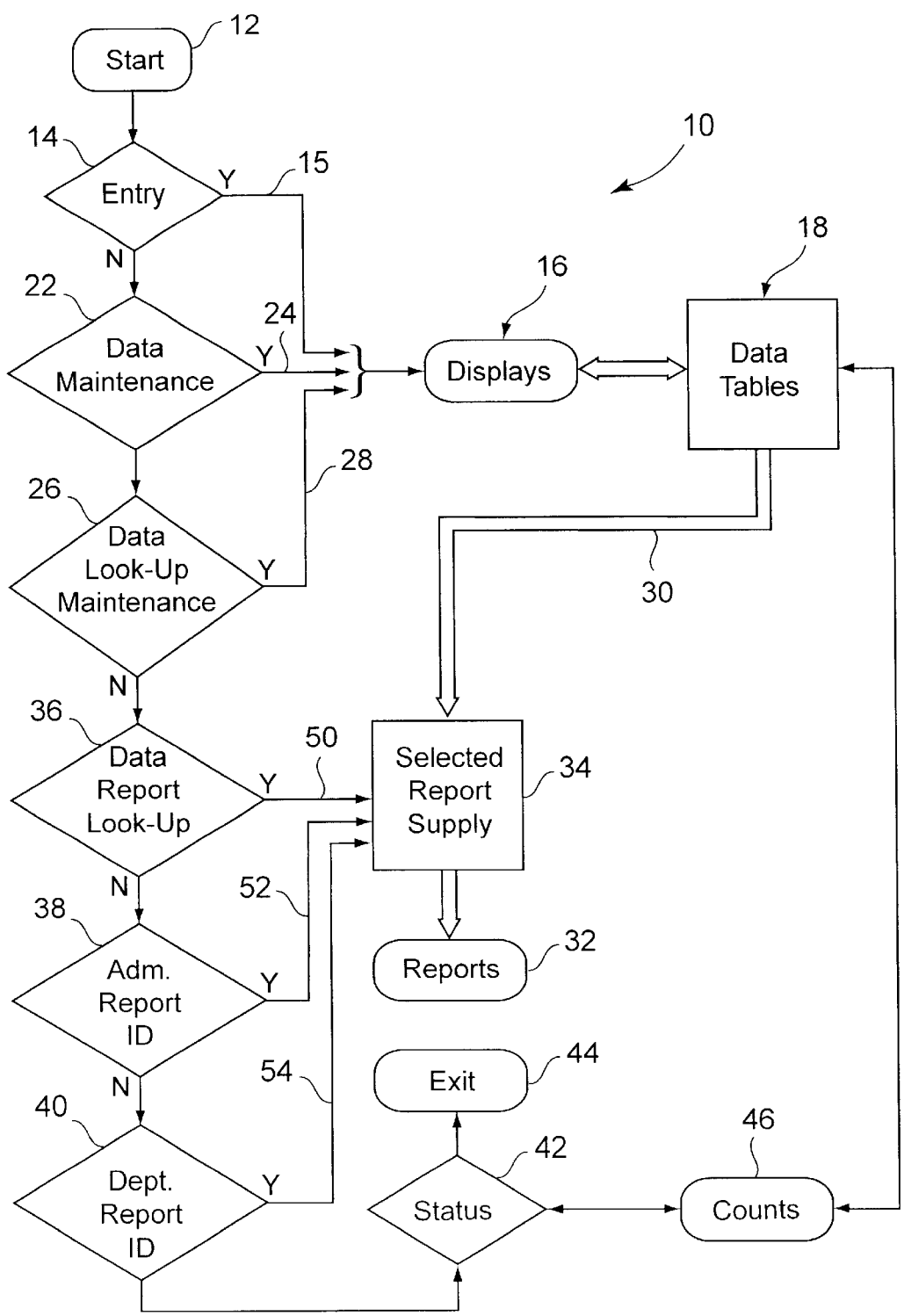
FIG. 1 is a block diagram of the computer operated program with which the present invention is associated.

Referring now to the drawing in detail, FIG. 1 diagrams a computer operated program, generally referred to by reference numeral 10, with which the present invention is associated. Such program 10 is applicable to an organization of employees assigned to predetermined missions associated for example with a sea-going vessel or ship during its entire life cycle so as to assess technical skills in connection with studies of the early design cost of the ship and weight analyses and production and logistic support development thereafter to subsequent operational stages which include maintenance, alteration and modernization of the ship. The program 10 is initiated at the start of a mission by a stage 12 during which employee personal information, collected on a homework data sheet for example, is entered into the program through an entry stage 14 having an input data delivery path 15 as diagrammed in FIG. 1.

With continued reference to FIG. 1, all of the foregoing referred to collected input data coded by processing during the entry stage 14 is delivered along path 15 for storage within data tables by supply through a data display stage 18 to stage 16. Such input data is initially supplied as information in sequence through path 15 and subsequently supplied as repeated data through path 20 to a data maintenance stage 22 from which it is forwarded through path 24 to stage 16 for repeated updating of the data tables. Data related to the furnishing of reports is supplied from the data maintenance stage 22 to a data look-up stage 26 from which it is supplied along one path 28 to stage 16 for establishing access to the data tables.

Updated data in the tables formed during stage 16 of the program may be extracted along a plurality of paths 30 for supply of reports 32 on technical skills of the employees displayed and extracted through stage 34. The supply of reports 32 are under control of a report look-up stage 36 so as to provide access to the data tables from the data received from look-up maintenance stage 26, from which such data is supplied in sequence to different data selection stages 38 and 40. The report selection outputs of stages 38 and 40 are accordingly fed to the stage 34 in parallel with the output from stage 36 as diagrammed in FIG. 1. In the illustrated embodiment, report selections are made in accordance with administrative rules through stage 38 and identification of mission-related departments or directorates through stage 40. The operations performed on the employee technical skill data in stages 36, 38 and 40 are based on charted information regarding knowledge levels and skill category definitions associated therewith having a numbering system (ESWBS) utilized as coding of the collected data stored in tables during stage 16. Such numbering system includes numbers assigned on the basis of skill analyses to mission equipment categories, mission directorates and employee experiences.

The status of the program 10 is timely displayed through stage 42 under control of stage 40 to denote data processing completion through exit stage 44. Toward that end, the status stage 42 is operationally connected to the data table stage 16 through data count stage 46. According to one embodiment of the invention, the employee information collected for input into the program 10 through entry stage 14, falls within nine different employee identifying and skill influencing categories as diagrammed in FIG. 2. Such categories consists of: 1) employee social security numbers (SSN); 2) educational background information such as schools and graduation dates, 3) technical or professional society memberships, 4) technical and administrative licenses, 5) patents granted to the employee, 6) publications of the employee applicable to the mission, 7) foreign languages of the employee, 8) information on employee awards and 9) mission related skills falling within four different levels respectively assigned numerical values for coding purposes as hereinafter referred to.

Figure 2:
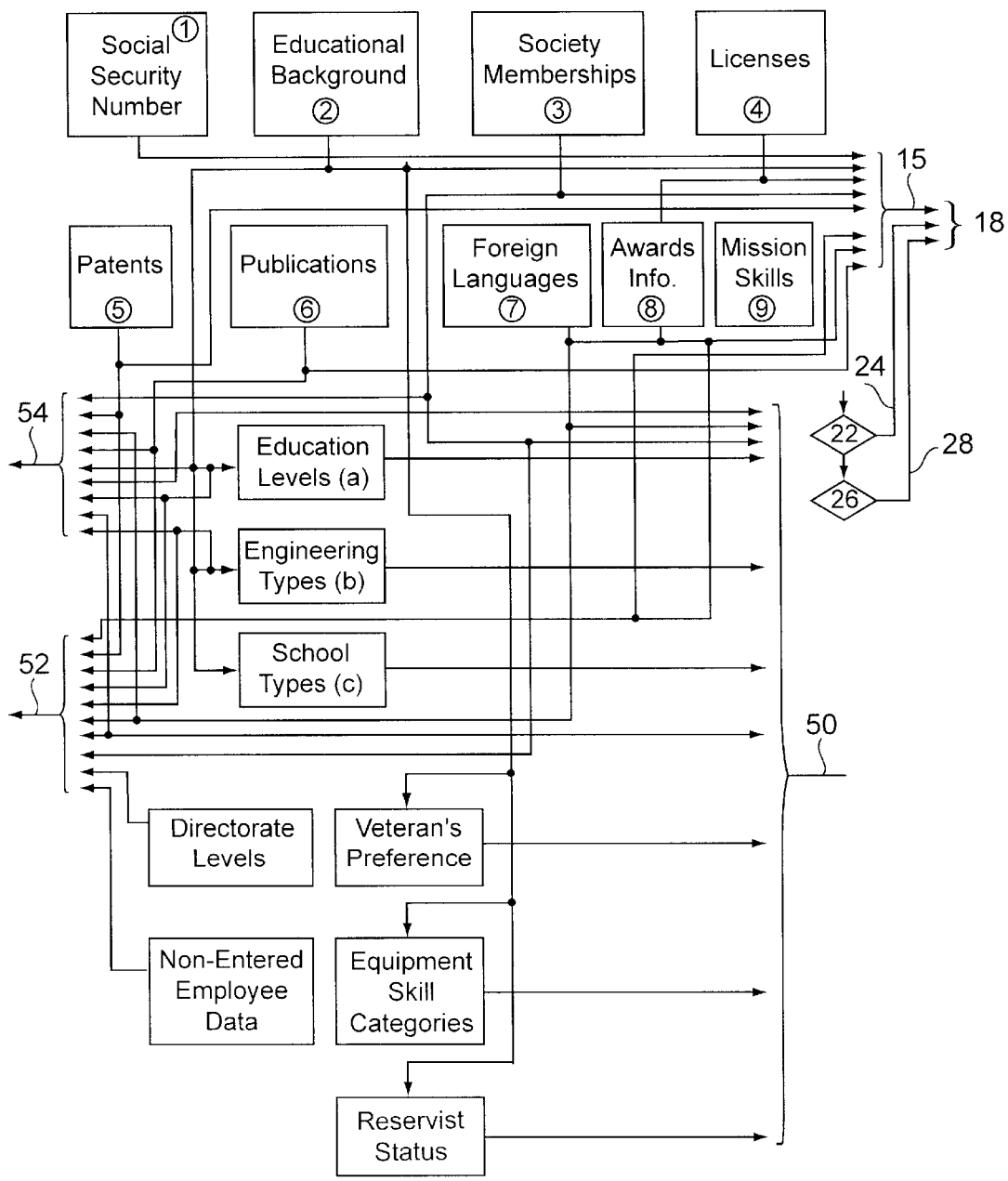
FIG. 2 is a diagram of the data charting and category listing associated with the program diagrammed in FIG. 1.

FIG. 2 also diagrams the category content of the report access look-up supplied through path 50 from stage 36. Such look-up action applies to ten different items extracted from the data table of stage 16 which includes (a) educational level, (b) engineering types and (c) school types derived from the educational background category of the aforementioned entry data forwarded through display stage 18. Also included in such look-up are the society memberships, mission skill levels and foreign language categories of the entry data, as well as additional items such as veteran's preference, category and reservist status extracted from personal information for each employee identified by social security number from an available Civilian Personal Data System (DCPDS). Coding for different skill levels involves for example four numbers 1,2, 3 and 4 consistent with a numbering system providing equipment category numbers, directorate numbers and experience numbers. Also, a skill category definition chart is provided. Storage of employee administrative skill levels in the report supply stage 34 is obtained through path 52 from stage 38 from analyses based on the patents, licenses, languages, societies, and publication categories as well as the categories of education levels, engineering types and missions, together with directorate levels and non-entered employee data as diagrammed in FIG. 2. As to department selection control applied to stage 34 through path 54 from stage 40, FIG. 2 diagrams supply of employee data on education background, society memberships, licenses, patents, publications, languages and awards as well as data under the categories of mission skills and education levels.

As hereinbefore pointed out with respect to FIGS. 1 and 2, a database is established for individual employees respectively identified by social security number (SSN) by storage of employee skill data in tables through program stage 16 from the entry stage 14 through path 15, data maintenance stage 22 through path 24 and data look-up stage 26 through path 28. FIG. 2 diagrams the particular categories of the entry data supplied through paths 15, 24 and 28 and display stage 18 to the updated data tables generated during stage 16 of the program. The employee skill categories underlying the data supplied through path 15 together with various other data categories as diagrammed in FIG. 2, underly the data respectively supplied through paths 30, 50, 52 and 54 from stages 16, 36, 38 and 40 to stage 34 to formulate the selected reports 32 furnished in accordance with the automated skills program 10 hereinbefore described.

Obviously, other modifications and variations of the present invention may be possible in light of the foregoing teachings. It is therefore to be understood that within the scope of the appended claims the invention may be practiced otherwise than as specifically described.

What is claimed is:

1. A method of generating reports furnishing data from which to assess comparative technical skills of employees of an organization having departments respectively in charge of performing different missions, including the steps of:

initially entering collected personnel information in sequence with respect to said employees respectively identified by social security numbers' storing said collected personnel information as identified data within tables under a plurality of different skill influencing categories;

coding the employee identified data within said tables in accordance with directorate code numbering of said departments and said administrative code numbering related to experiences of the employees, said missions and numerical values assigned to skill level associated with the technical skills of the employees evaluated from the personnel information respectively collected under the different skill influencing categories; and extracting reports from the tables under selected categories of the collected personnel information following said storing and said coding thereof;

wherein said different missions cover maintenance alteration and modernization of sea-going vessels.

2. A method of generating reports furnishing data from which to assess technical skills of employees, including the steps of:

initially entering collected personnel information in sequence in regard to said employees;

storing said collected personnel information as employee identified data within tables under a plurality of different skill influencing categories;

coding the stored employee identified data within said tables in accordance with code numbering of said identified data within said tables; and extracting reports from selected categories of the collected personnel information from the tables following said storing and said coding thereof;

wherein said different missions cover maintenance, alteration and modernization of sea-going vessels.

* * * * *